United States Patent [19]

Yamada

[11] Patent Number: 5,243,196
[45] Date of Patent: Sep. 7, 1993

[54] FILM IMAGE REGISTRATION SYSTEM WITH IMAGE FILING AND ILLUMINATION CONTROL

[75] Inventor: Shizuo Yamada, Tokyo, Japan

[73] Assignee: Yamada Medical Sharing, Inc., Tokyo, Japan

[21] Appl. No.: 873,213

[22] Filed: Apr. 24, 1992

[51] Int. Cl.[5] ............................................. G06K 7/10
[52] U.S. Cl. .................................. 250/570; 353/26 A
[58] Field of Search ....................... 250/570, 208.1, 548, 250/205; 353/26 R, 26 A, 27 R

[56] References Cited

U.S. PATENT DOCUMENTS 3,885,866  5/1975  Stearns .............................. 250/570

Primary Examiner—David C. Nelms
Attorney, Agent, or Firm—Wenderoth, Lind & Ponack

[57] ABSTRACT

A film image registration system includes a film reader for optically reading a front surface of a film set therein to obtain a film image. A film illumination device emits light to illuminate the film from a back surface of the film. The quantity of light emitted by the film illumination device is controlled according to a given command. The film image is received and formed into an image data file which is stored in a mass data storage.

4 Claims, 5 Drawing Sheets

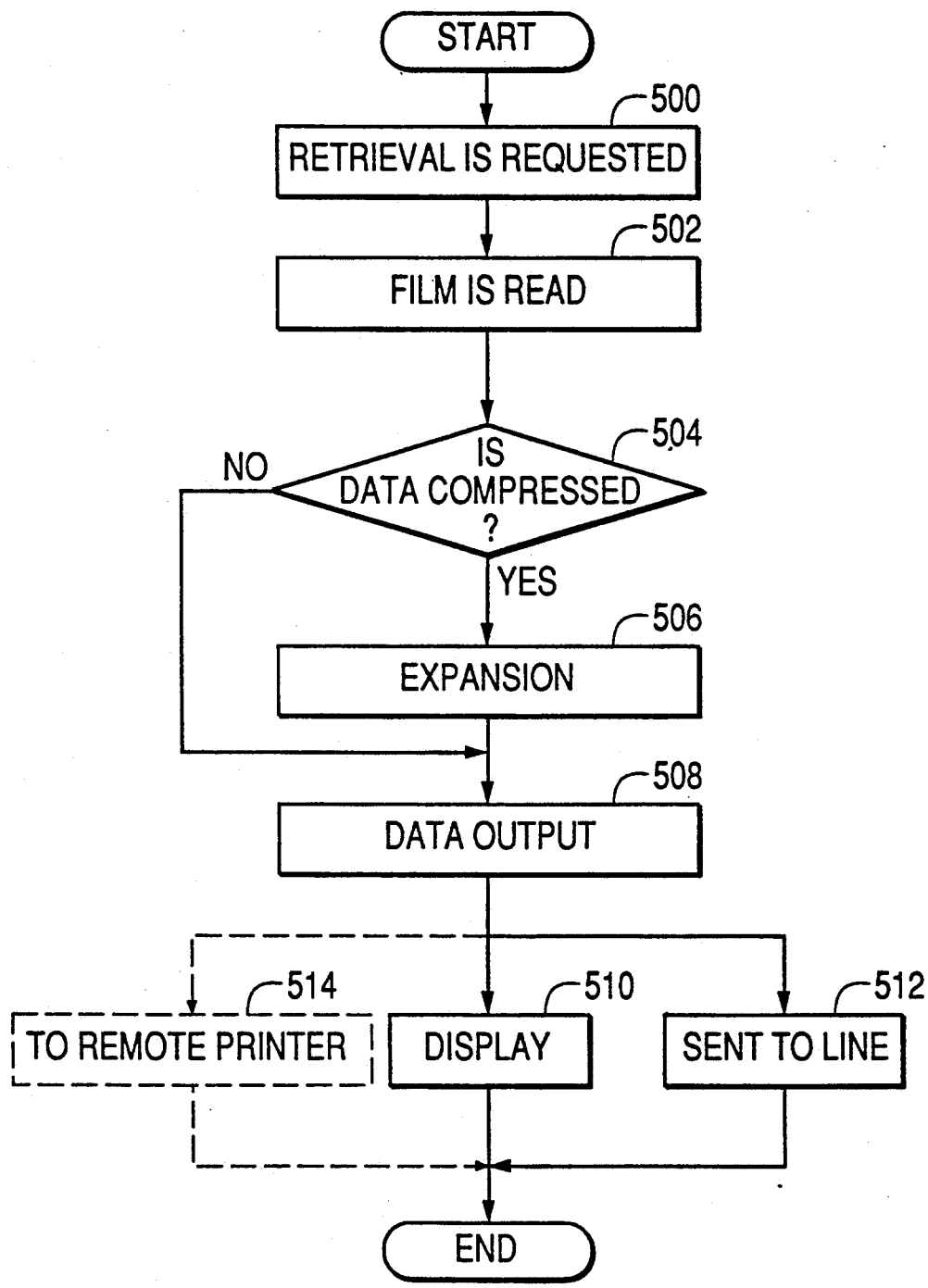

FILM IMAGE REGISTRATION SYSTEM WITH IMAGE FILING AND ILLUMINATION CONTROL

BACKGROUND OF THE INVENTION

This invention relates to a system for reading films optically and registering files of the read images.

In medical fields, a hardcopy film produced, for example, using ultrasonic, magnetic resonance imaging and X-ray equipment must be efficiently managed together with corresponding medical charts.

The films or their copies are read by a scanner to form an image data file, which may then be placed with a document file of the corresponding charts under computerized control.

According to a conventional scanner, however, the film or its copy is illuminated only from the side to be read and that same side is scanned by a one-dimensional image sensor.

Then, the image sensor outputs read data, which are compressed into a file. This image file is in turn registered together with a document file of the corresponding chart.

With such a system, where an image file of each film is registered along with a document file of the corresponding chart, it is possible to manage and use images with satisfactory efficiency.

However, the resolution or density contrast of the film images achieved using the conventional scanner have been insufficient for diagnosis. Thus, there is strong demand for increasing that resolution.

SUMMARY OF THE INVENTION

An object of this invention is to provide a film image registration system which makes it possible to obtain a film image with sufficiently high resolution.

According to a first aspect of this invention, referring to FIG. 1 showing the principle components of the invention, the above-mentioned object is achieved by providing a film image registration system including film reader means 12 for providing an optical reading of a film 10 set therein, film illumination means 14 for illuminating the film 10 from the back surface of the film 10, quantity-of-light control means 16 for controlling the quantity of light used to illuminate the film 10 according to a given command, image filing means 18 for accepting and creating image files of the read film 10, and mass storage means 20 for storing the filed image.

According to a second aspect of the invention, a film image registration system includes film reader means 12 for providing an optical reading of a film 10 set therein, film illumination means 14 for illuminating the film 10 from the back surface of the film 10, quantity-of-light control means 16 for controlling the quantity of light used to illuminate the film 10 according to a given command, a light-transmitting diffused-reflection sheet 22 inserted between the film 10 and the film illumination means 14, image filing means 18 for accepting and creating image files of the read film 10 read, and mass storage means 20 for storing the filed image.

According to a third aspect of the invention, a film image registration system includes film reader means 12 for providing an optical reading of a film 10 set therein, film illumination means 14 for illuminating the film 10 from the back surface of the film 10, quantity-of-light control means 16 for controlling the quantity of light used to illuminate the film 10 according to a given command, a light-transmitting diffused-reflection sheet 22 inserted between the film 10 and the film illumination means 14, image filing means 18 for accepting an image of the read film 10 and creating a file in which said image is compressed, mass storage means 20 for storing the filed image, data reader means 24 for reading an addressed read image file from the image storage means 20 and data output means 26 for expanding and outputting the read image.

According to a fourth aspect of the invention, a film image registration system includes film reader means 12 for providing an optical reading of a film 10 set therein, film illumination means 14 for illuminating the film 10 from the back surface of the film 10, quantity-of-light control means 16 for controlling the quantity of light used to illuminate the film 10 according to a given command, a light-transmitting diffused-reflection sheet 22 inserted between the film 10 and the film illumination means 14, image filing means 18 for accepting an image of the read film 10 and creating a file in which said image is compressed, mass storage means 20 for storing the filed read image, document file storage means 28 for storing a document file corresponding to the filed image, data reader means 24 for reading an addressed image file and the corresponding document file from the mass storage means 20 and document file storage means 28, and data output means 26 for expanding and outputting the read image together with the read document file.

According to the first aspect of the invention, the film 10 set in the system is illuminated from the back surface thereof and the quantity of light used to illuminate the film 10 is controlled according to a given command. In this way, the density contrast of the film 10 is made clear by the illuminating light passing through the film 10, thereby enabling the film 10 to be optically read with sufficient resolution.

According to the second aspect of the invention, a light-transmitting diffused-reflection sheet 26, inserted between the film 10 set in the system and the film illumination means 22, is provided to uniformly illuminate the film from the back.

According to the third aspect of the invention, the read image data of the film read is compressed and stored as a file. When the image file is read, it is expanded and outputted.

According to the fourth aspect of the invention, a document file is provided per filed image, so that the image file and the corresponding document file can be read to output the contents of both files.

BRIEF DESCRIPTION OF THE DRAWINGS

This invention will now be explained in detail in a non-limiting manner with reference to the accompanying drawings, in which:

FIG. 5 is a flow chart illustrating how data retrieval is effected.

DESCRIPTION OF THE PREFERRED EMBODIMENTS

Figure 1:
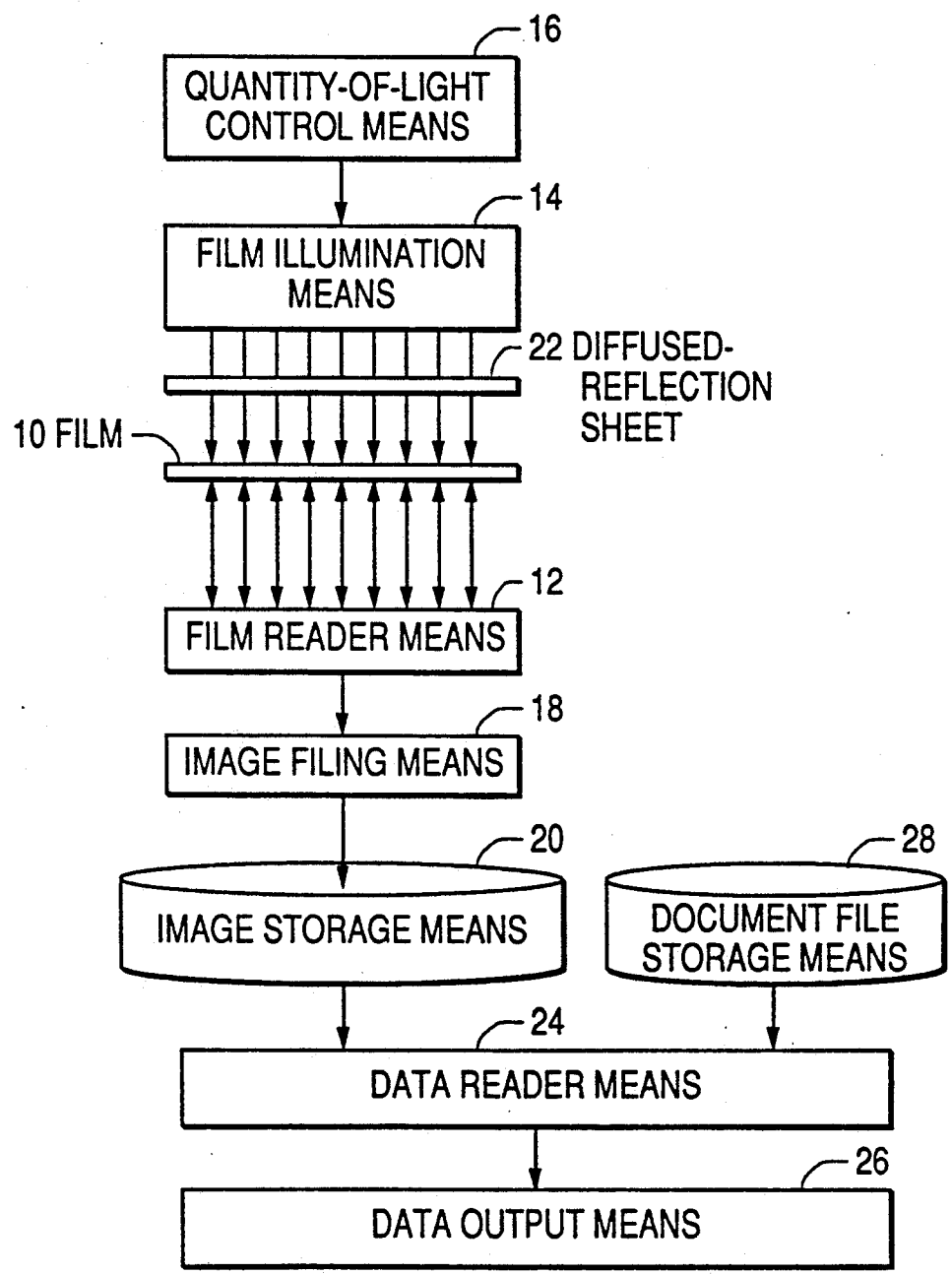
FIG. 1 illustrates the principle components of the invention.
Figure 2:
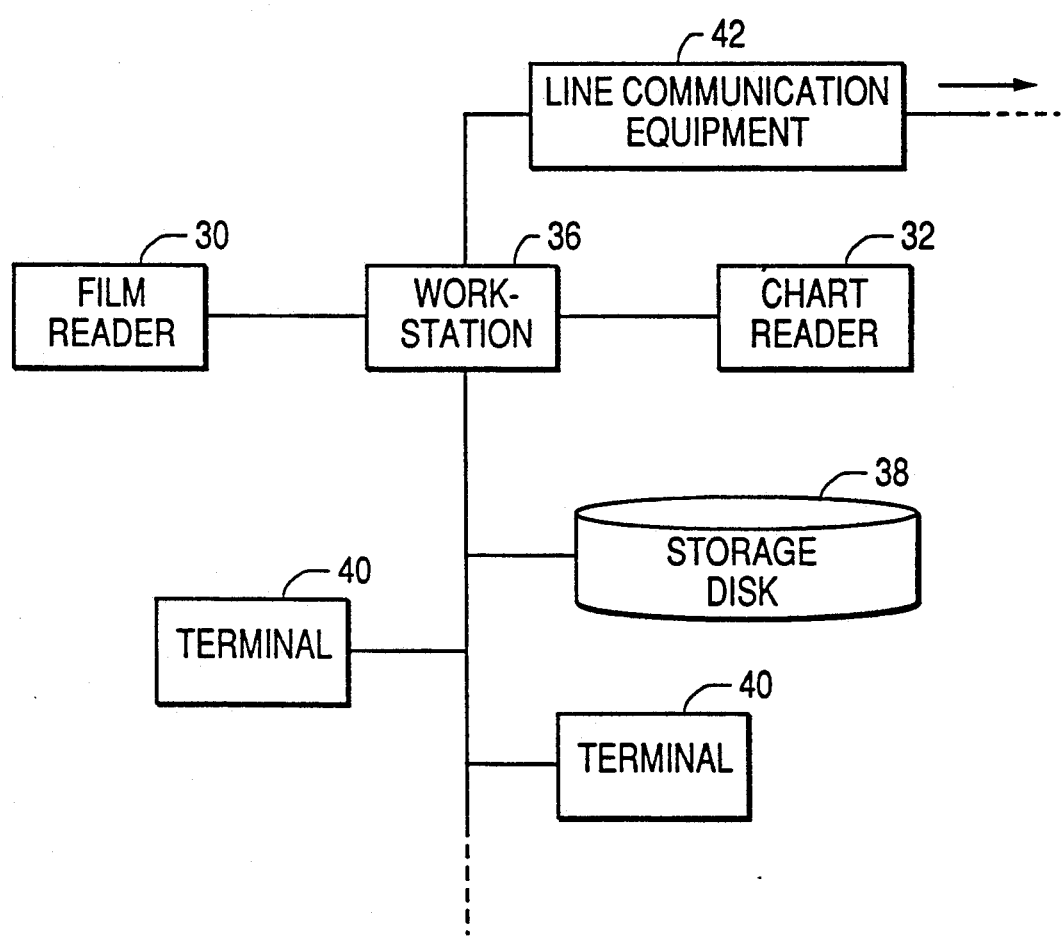
FIG. 2 illustrates the construction of one embodiment of the invention.

Referring to FIG. 2 illustrating the general construction of one embodiment of the film image registration system according to this invention, a hardcopy film obtained from, e.g. ultrasonic or magnetic resonance or X-ray equipment, is read directly by a film reader 30.

A chart, on the other hand, is read by a chart reader 32. Files of the image data obtained by the film and chart readers 30 and 32 are registered in a mass Storage disc 38 using a workstation 36.

When the registered film and chart images are requested by a terminal 40 via the workstation 36, data files of the corresponding film and chart images are sent to the workstation 36, terminal 40 or line communications equipment 42 which has been addressed for outputting.

Figure 3:
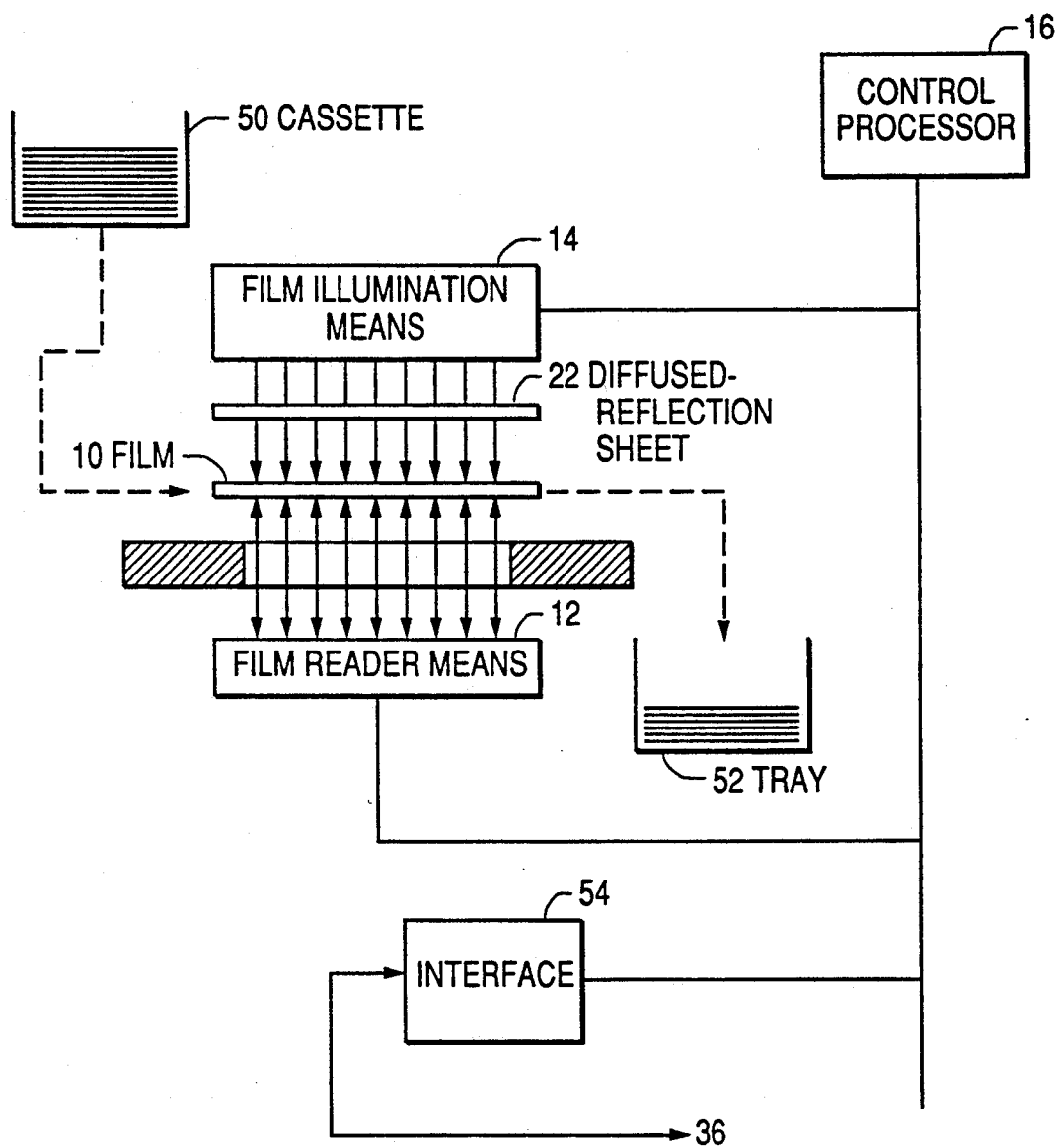
FIG. 3 illustrates the construction of a film reader used in the embodiment.

Turning to FIG. 3, the film reader 30 includes film reader means 12, film illumination means 14, a control processor 16, a diffused-reflection sheet 22, a cassette 50, a tray 52 and an interface 54.

The film reader means 12 operates to read the film 10 set directly therein. To this end, a one-dimensional image sensor comprising a linear CCD array may be used, providing an image output in which the quantity of incident light is expressed in multi-intensity levels.

The film illumination means 14 operates to direct illumination on the back surface of the film 10 set directly in the system.

As a light source for this purpose, any of the following may be used:

a plurality of halogen lamps arranged in matrix form;

a plurality of fluorescent lamps in parallel and linear form;

a laser oscillator which generates scanning laser beams; and a number of light-emitting semiconductor elements arranged in matrix or linear form such that they can be moved for scanning.

It is noted that much more satisfactory results are obtained if halogen or fluorescent lamps are used.

The control processor 16 operates to control the quantity of light used to illuminate the back surface of the film 10 in accordance with whether the film 10 is illuminated entirely or locally.

This processor 16 includes an MPU, a RAM and a ROM. According to the content of the ROM, RAM processings (including the processing for controlling the illumination quantity) take place in the MPU.

Whether the film 10 is illuminated wholly or locally, which controls the illumination quantity, is fed from the workstation 36 to the MPU of the processor 16.

The diffused-reflection sheet 22 is designed to illuminate the back surface of film 10 uniformly and may be formed of an opaque sheet material (e.g., a frosted glass sheet).

The cassette 50 contains a number of films 10 to be read, and includes a feed mechanism for automatically feeding films 10 one by one to a reading position.

The tray 52 is provided to accommodate films 10 that have been discharged from the system after reading.

The interface 54 operates to receive commands from the workstation 36, including a command as to whether the film 10 is to be illuminated wholly or locally, and to feed the received commands to the MPU of the control processor 16.

This interface 54 also operates to feed the image data of the film read by the film reader 12 to the workstation 36 according to instructions given by the control processor 16.

The workstation 36 includes a station main computer, a keyboard, a mouse and a display, the keyboard being used to input various commands and data.

The mouse is used in determining the target quantity of light for back illumination and including addressing regions of the film for specifying quantities of light.

The display includes a rectangular image frame indicating various conditions, the contents of films read and regions of films that are addressed for controlling the quantity of light (including the affected portions to be diagnosed).

The operation of the above-mentioned embodiment will now be explained.

Figure 4:
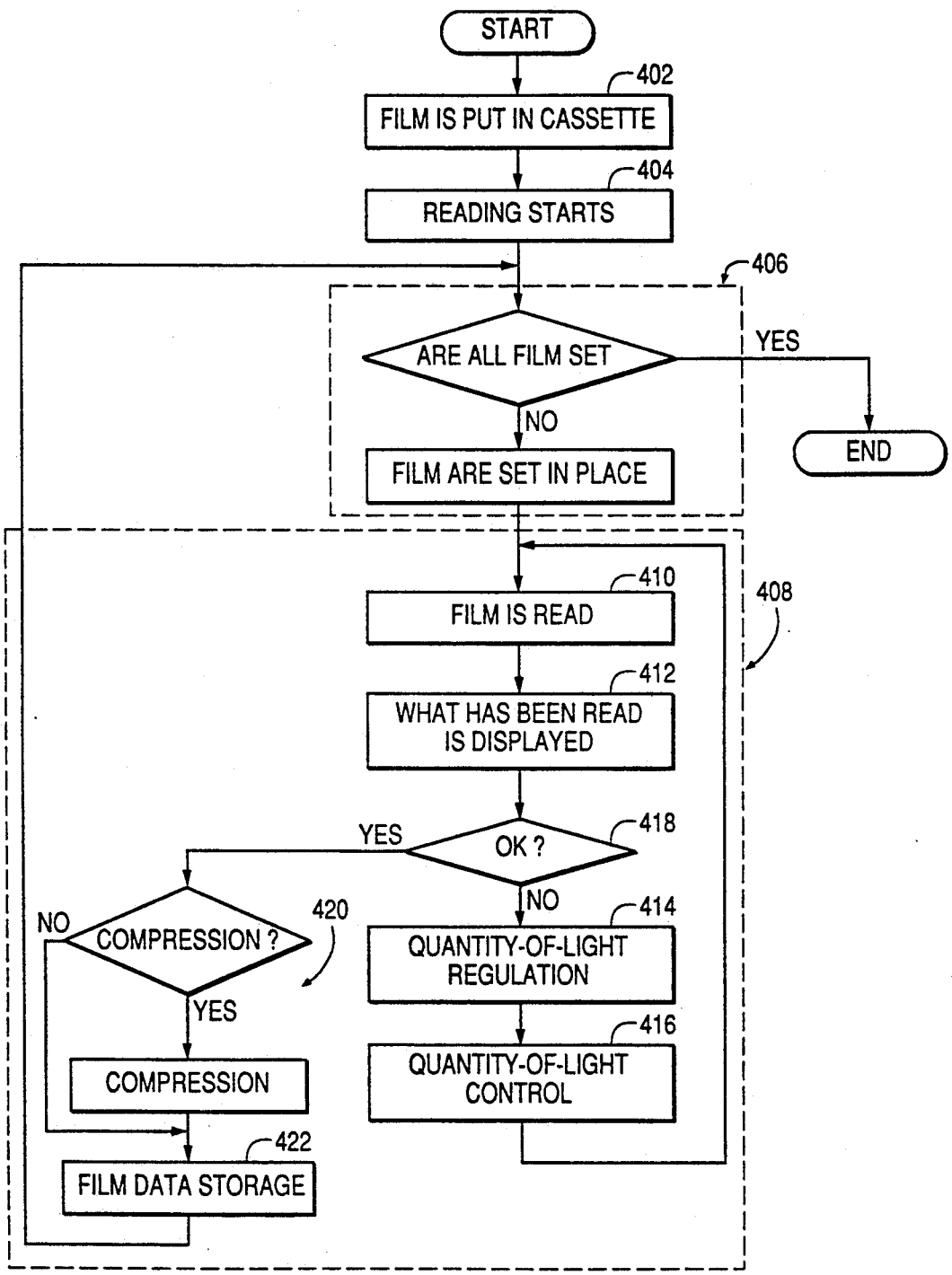
FIG. 4 is a flow chart illustrating how a film is read.

FIG. 4 is a flow chart illustrating how a film is read. First, all the films 10 to be read are placed into the cassette 50 (Step 402).

Then, the workstation 36 (or alternatively the terminal 40) operates (Step 404) to provide a command to the film reader 30 to start the reading of each film 10.

According to this command, the films 10 are automatically removed from the cassette 50 one by one (Step 406). As each film 10 is set in the system, the registered image is edited (Step 408).

At the editing Step 408, the film 10 is read (Step 410), and the thus read image is displayed (Step 412). If the displayed read image is satisfactory (OK at Step 418), the process proceeds to Step 420. If the displayed read image is not satisfactory, an operational input is received for determining the target quantity of light for back illumination according to whether the film is illuminated wholly or locally (Step 414) and the film illumination means 14 is controlled according to the quantity of light thus determined (Step 416). This process is repeated until a satisfactory display is obtained.

After the results of the editing process have been compressed as needed (Step 420), they are stored in the storage disk 38 in a form corresponding to the image data of the chart read by the chart reader 32 (Step 422).

The retrieval of the film and chart image data is now explained with reference to FIG. 5. Upon a request for retrieval of the film and chart image data from any one of terminals 40 (including the workstation 36) (Step 500), the image data files of the corresponding film and chart are read from the storage disc 38 (Step 502).

At this time, it is determined whether the read file data has been compressed (Step 504). If compression has occurred, the data is expanded as needed (Step 506).

Then, the film and chart image data are output (Step 508) to the display of the requesting terminal to another addressed terminal 40 (Step 510), or alternatively fed through the line communications equipment 42 to an external line (Step 512).

Also, the retrieved data may be sent to a remote printer (Step 514).

Also, the image data may be fed to an image processor, whereby three-dimensional image data may be obtained. Three-dimensional image data enables a more precise and definite diagnosis to be effected from one X-ray film.

According to this invention as mentioned above, the film 10 to be read is illuminated from the back surface and the back illumination occurs uniformly using the diffused-reflection sheet 22.

The quantity of light for back illumination is properly controlled, and this control is more finely effected with respect to affected parts to be diagnosed.

Thus, this invention makes is possible to obtain a film image with clearer density contrast and sufficiently high resolution.

In addition, the image of the film 10 read can be compressed for registration, such that much more data can be stored in the storage disc 38.

Furthermore, the system can be incorporated in a network so that the read image of the film 10 and the read image of the corresponding chart can be retrieved and sent to a predetermined display, external line, printer, etc. Thus, the films can be more efficiently and flexibly used together with the corresponding charts.

According to this invention as described above, it is possible to obtain a high-quality film image with clearer density contrast and sufficiently high resolution, since the film to be read is uniformly illuminated from the back surface of the film through the diffused-reflection sheet and the quantity of light used for illumination is placed under proper control.

I claim:

1. A film image registration system comprising:
   film reader means for optically reading a front surface of a film set therein to obtain a film image;
   film illumination means for emitting light to illuminate said film from a back surface of said film;
   quantity-of-light control means, operatively coupled to said film illumination means, for controlling a quantity of light emitted by said film illumination means according to a given command;
   image filing means, operatively coupled to said film reader means, for receiving and forming an image data file of said film image obtained by said film reader means; and,
   mass storage means, operatively coupled to said image filing means, for storing said image data file formed by said image filing means.

2. A film image registration system comprising:
   film reader means for optically reading a front surface of a film set therein to obtain a film image;
   film illumination means for emitting light to illuminate said film from a back surface of said film;
   a light-transmitting diffused-reflection sheet located between said back surface of said film and said film illumination means;
   quantity-of-light control means, operatively coupled to said film illumination means, for controlling a quantity of light emitted by said film illumination means according to a given command;
   image filing means, operatively coupled to said film reader means, for receiving and forming an image data file of said film image obtained by said film reader means; and,
   mass storage means, operatively coupled to said image filing means, for storing said image data file formed by said image filing means.

3. A film image registration system comprising:
   film reader means for optically reading a front surface of a film set therein to obtain a film image;
   film illumination means for emitting light to illuminate said film from a back surface of said film;
   a light-transmitting diffused-reflection sheet located between said back surface of said film and said film illumination means;
   quantity-of-light control means, operatively coupled to said film illumination means, for controlling a quantity of light emitted by said film illumination means according to a given command;
   image filing means, operatively coupled to said film reader means, for receiving and forming a compressed image data file of said film image obtained by said film reader means; and,
   mass storage means, operatively coupled to said image filing means, for storing said compressed image data file formed by said image filing means;
   data reader means, operatively coupled to said mass storage means, for reading an addressed compressed image data file from said mass storage means; and,
   data output means, operatively coupled to said data reader means, for expanding and outputting said compressed image data file read by said data reader means.

4. A film image registration system comprising:
   film reader means for optically reading a front surface of a film set therein to obtain a film image;
   film illumination means for emitting light to illuminate said film from a back surface of said film;
   a light-transmitting diffused-reflection sheet located between said back surface of said film and said film illumination means;
   quantity-of-light control means, operatively coupled to said film illumination means, for controlling a quantity of light emitted by said film illumination means according to a given command;
   image filing means, operatively coupled to said film reader means, for receiving and forming a compressed image data file of said film image obtained by said film reader means; and,
   mass storage means, operatively coupled to said image filing means, for storing said compressed image data file formed by said image filing means;
   document file storage means for storing document files corresponding to compressed image data files stored in said mass storage means;
   data reader means, operatively coupled to said mass storage means and said document file storage means, for reading an addressed compressed image data file from said mass storage means and for reading a document file corresponding to the addressed compressed image data file from said document file storage means; and,
   data output means, operatively coupled to said data reader means, for expanding and outputting said compressed image data file and for outputting said document file read by said data reader means.

* * * * *